US006856392B1

(12) United States Patent
Tsuji (10) Patent No.: US 6,856,392 B1
(45) Date of Patent: Feb. 15, 2005

(54) OPTICAL ELEMENT WITH ALIGNMENT MARK, AND OPTICAL SYSTEM HAVING SUCH OPTICAL ELEMENT

(75) Inventor: Toshihiko Tsuji, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,300

(22) Filed: Nov. 5, 1999

(30) Foreign Application Priority Data

Nov. 9, 1998 (JP) ............................................. 10-333429

(51) Int. Cl.[7] .......................... G01B 11/00; G06F 9/00; G02B 5/18
(52) U.S. Cl. .......................... 356/399; 430/22; 359/569
(58) Field of Search .................................. 356/399–401, 356/490, 508, 521, 359; 216/24, 26; 355/53, 55; 430/5, 22, 30; 359/565, 558, 566, 569, 742; 250/237 G, 548, 559.29, 559.3

(56) References Cited

U.S. PATENT DOCUMENTS

| | | | | |
|---|---|---|---|---|
| 4,614,433 A | * | 9/1986 | Feldman et al. | ............ 356/401 |
| 4,636,077 A | * | 1/1987 | Nomura et al. | ............. 356/499 |
| 5,161,059 A | * | 11/1992 | Swanson et al. | ............. 359/565 |
| 5,294,980 A | * | 3/1994 | Matsugu et al. | ............. 356/401 |
| 6,120,950 A | * | 9/2000 | Unno | ........................ 356/399 |

FOREIGN PATENT DOCUMENTS

| | | | | |
|---|---|---|---|---|
| EP | 0 455 443 | 11/1991 | | |
| JP | 04-236416 | 8/1992 | | |
| JP | 07-253528 | 10/1995 | | |
| JP | 08083747 A | * | 3/1996 | ......... H01L/21/027 |
| JP | 10-135118 | 5/1998 | | |

OTHER PUBLICATIONS

US Patent Application Publication US 2003/0043462 A1, Sekine, filed Oct. 1, 1999, published Mar. 6, 2003.*

* cited by examiner

*Primary Examiner*—Zandra V. Smith
*Assistant Examiner*—Gordon J. Stock, Jr.
(74) *Attorney, Agent, or Firm*—Fitzpatrick, Cella, Harper & Scinto (57) ABSTRACT

A diffractive optical element having a design wavelength $\lambda$, includes a diffractive surface for diffracting predetermined light corresponding to the design wavelength, and a mark shaped so that, with regard to the predetermined light, a phase difference corresponding to a multiple, by an integer, of the design wavelength $\lambda$ is produced between (i) a light ray, of the predetermined light, as transmitted through or reflected by the mark and (ii) a light ray, of the predetermined light, as transmitted through or reflected by a portion adjacent to the mark, and that, with regard to second light of a second wavelength $\lambda'$ different from the design wavelength $\lambda$, no phase difference corresponding to a multiple, by an integer, of the second wavelength $\lambda$ is produced between (a) a light ray, of the second light, as transmitted through or reflected by the mark and (b) a light ray, of the second light, as transmitted through or reflected by a portion adjacent to the mark.

13 Claims, 5 Drawing Sheets

OPTICAL ELEMENT WITH ALIGNMENT MARK, AND OPTICAL SYSTEM HAVING SUCH OPTICAL ELEMENT

FIELD OF THE INVENTION AND RELATED ART

This invention relates to an optical element with an alignment mark, and an optical system having such optical element. An optical element according to the present invention is suitably usable in an imaging optical system of a camera for forming an image of a subject upon a photosensitive material, an image forming optical system for optically scanning the surface of a photosensitive drum to produce imagewise information thereupon, a projection optical system (projection lens) for projecting an electronic circuit pattern of a mask onto a wafer in the manufacture of a semiconductor device such as IC or LSI, or an illumination optical system for illuminating such mask, for example.

Many diffractive optical elements and optical systems having such elements have been proposed recently. Examples of such diffractive optical elements are a Kinoform, binary optics, a Fresnel zone plate, and a hologram.

A diffractive optical element can be used as an optical element for transforming an incident wavefront to a predetermined wavefront. Such diffractive optical element has features distinguished over a dioptric lens. For example, it has a dispersion value inverse to a dioptric lens, and it has substantially no thickness.

It is known that a diffractive optical element can be formed with a sectional shape of saw-tooth shape such as a blazed shape or Kinoform shape, by which a diffraction efficiency of 100% can be attained with respect to the design wavelength. Practically, however, it is very difficult to produce a complete blazed shape. For this reason, a diffractive optical element called a "binary optics" element is used, wherein a blazed shape or Kinoform shape is approximated with use of a step-like sectional shape.

Generally, a binary optics element can be produced on the basis of a lithographic process, and a very fine pitch can be achieved relatively easily.

Figure 8:
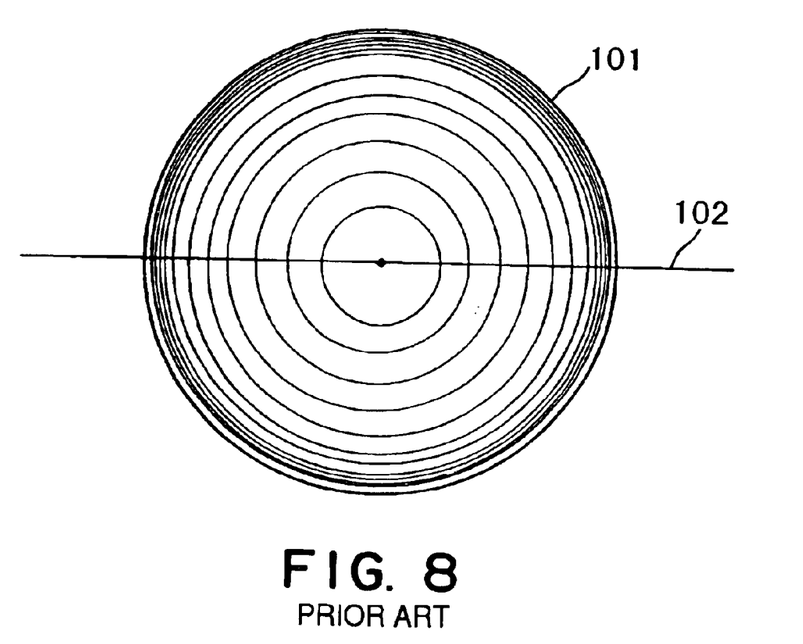
Figure 9:
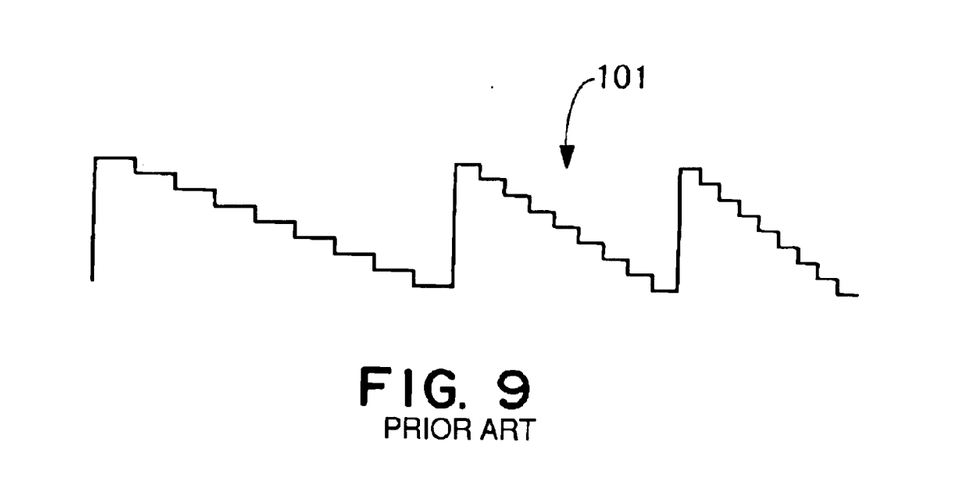

FIG. 8 shows an example of a binary optics element, wherein denoted at 101 is a diffractive optical element. FIG. 9 shows a sectional shape of the diffractive optical element 101, along a line 102 in FIG. 8. In the case of a binary optics element with eight levels such as shown in FIG. 9, a diffraction efficiency not less than 95% can be kept for first-order diffraction light.

For higher degree approximation or for increased power of a diffractive optical element, the pitch of a periodic structure of the diffractive optical element should be made small as much as possible. Thus, a lithographic procedure having been advanced and improved through the semiconductor manufacture is used for production of high performance diffractive optical elements. Since a diffractive optical element is produced through a lithographic process, a product element is a thin plate-like member.

When such diffractive optical element is incorporated into a barrel of a projection optical system, a ring-like holding member (hereinafter, cell) having a thickness larger than the diffractive optical element may be bonded to a peripheral edge portion of the diffractive optical element to form an integral structure, to thereby assure a required strength. The diffractive optical element may be held together with the cell by the barrel of the projection optical system. The positioning of the cell may be accomplished on the basis of the outside diameter of the cell.

When the cell is bonded to the diffractive optical element, the center of the cell and the center of the diffractive optical element must be registered with each other at a high precision. If there is misalignment between the centers of the cell and of the diffractive optical element, there will occur an eccentricity error when they are incorporated into an optical system, and a resultant aberration produced thereby will deteriorate the performance of the optical system as a whole.

SUMMARY OF THE INVENTION

It is accordingly an object of the present invention to provide an optical element which enables easy alignment with any other member such as a cell described above.

It is another object of the present invention to provide an optical system having such optical element.

In accordance with an aspect of the present invention, there is provided a diffractive optical element having a design wavelength $\lambda$, comprising: a diffractive surface for diffracting predetermined light corresponding to the design wavelength; and a mark shaped so that, with regard to the predetermined light, a phase difference corresponding to a multiple, by an integer, of the design wavelength $\lambda$ is produced between (i) a light ray, of the predetermined light, as transmitted through or reflected by the mark and (ii) a light ray, of the predetermined light, as transmitted through or reflected by a portion adjacent to the mark. With regard to second light of a second wavelength $\lambda'$ different from the design wavelength $\lambda$, no phase difference corresponding to a multiple, by an integer, of the second wavelength $\lambda'$ is produced between (a) a light ray, of the second light, as transmitted through or reflected by the mark and (b) a light ray, of the second light, as transmitted through or reflected by a portion adjacent to the mark.

The mark may be placed at or adjacent a center of the diffractive surface and may be defined by a recess formed on the diffractive surface. The recess may be formed with a depth effective to assure that a phase difference corresponding to a multiple, by an integer, of the design wavelength $\lambda$ is produced between (i) a light ray, of the predetermined light, as transmitted through or reflected by the mark and (ii) a light ray, of the predetermined light, as transmitted through or reflected by a portion adjacent to the mark. In addition, no phase difference corresponding to a multiple, by an integer, of the second wavelength $\lambda'$ is produced between (a) a light ray, of the second light, as transmitted through or reflected by the mark and (b) a light ray, of the second light, as transmitted through or reflected by a portion adjacent to the mark.

The mark may be placed at or adjacent a center of the diffractive surface and may be defined by a protrusion formed on the diffractive surface. The protrusion may be formed with a height effective to assure that a phase difference corresponding to a multiple, by an integer, of the design wavelength $\lambda$ is produced between (i) a light ray, of the predetermined light, as transmitted through or reflected by the mark and (ii) a light ray, of the predetermined light, as transmitted through or reflected by a portion adjacent to the mark. Also, no phase difference corresponding to a multiple, by an integer, of the second wavelength $\lambda'$ is produced between (a) a light ray, of the second light, as transmitted through or reflected by the mark and (b) a light ray, of the second light, as transmitted through or reflected by a portion adjacent to the mark.

The diffractive surface and the mark may be adapted to transmit light rays of the wavelengths λ and λ', or they may be adapted to reflect light rays of the wavelengths λ and λ'.

The diffractive surface may comprise a binary optics element, and the diffractive surface and the mark may be formed in accordance with a lithographic process.

The diffractive optical element may further comprise a substrate on which the diffractive surface and the mark are formed, and a metal ring for holding the substrate.

The diffractive optical element may further comprise a metal ring, wherein the mark may be placed at a center of the diffractive surface, and the mark may be disposed at a central position of an outside circumference of the metal ring.

The mark and the central position of the metal ring may be registered with each other, on the basis of detection of the mark by use of the second light of the second wavelength λ'. During the registration operation, the outside periphery of the metal ring may be cut or scraped for the registration.

In accordance with another aspect of the present invention, there is provided a projection optical system including a diffractive optical element as described above.

In accordance with a further aspect of the present invention, there is provided a projection exposure apparatus for projecting a pattern onto a substrate by use of a projection optical system as described above.

In accordance with a yet further aspect of the present invention, there is provided a device manufacturing method, comprising the steps of: exposing a substrate with a device pattern by use of an exposure apparatus as described above; and developing the exposed substrate.

In a diffractive optical element according to a first preferred form of the present invention, the diffractive optical element is provided with a diffraction grating, formed on a substrate and having a periodic structure for transforming an incident wavefront into a predetermined wavefront, wherein an alignment mark is formed at or adjacent a central portion of the diffractive optical element.

In a diffractive optical element according to a second preferred form of the present invention, the diffractive optical element is provided with a diffraction grating of step-like sectional structure, formed on a substrate through approximation of a blazed shape on the basis of quantization, wherein an alignment mark is formed at or adjacent a central portion of the diffractive optical element.

In the diffractive optical element according a to the first or second preferred form described above, the alignment mark may comprise a recess or a protrusion formed on the substrate.

The alignment mark may have a phase difference, with regard to a region around the mark, of about $m\lambda/(n-1)$ where m is an integer, n is a refractive index of the material of the substrate, and λ is a design wavelength or a wavelength to be used for the diffractive optical element.

The alignment mark may be detected by use of light of a wavelength different from the design wavelength λ.

The alignment mark may be formed at a desired position on the diffraction grating structure of the diffractive optical element, during the manufacture of the diffractive optical element and in accordance with a process the same as the step-like structure forming process.

In an optical element according to a third preferred form of the present invention, the optical element serves to transform an incident wavefront to a predetermined wavefront, wherein there is an alignment mark formed at or adjacent a central portion of the optical element.

In an optical element according to a fourth preferred form of the present invention, the optical element has a mark which is transparent with respect to a wavelength λ to be used with the optical element.

In an optical element according to a fifth preferred form of the present invention, the optical element has a mark formed in a region through which exposure light is to pass, wherein the mark is transparent with respect to the exposure light.

In an optical element according to a sixth preferred form of the present invention, the optical element has an alignment mark formed in a region through which light is to pass.

In an optical element according to a seventh preferred form of the present invention, the optical element has an alignment mark formed in a region through which exposure light is to pass.

In the optical element according to any one of the third to seventh preferred forms described above, the mark may have a phase difference, with regard to a region around the mark, of about $m\lambda/(n-1)$ where m is an integer, n is a refractive index of the material of the substrate of the optical element, and λ is a design wavelength or a wavelength to be used for the optical element.

Also, the mark may be detected by use of light of a wavelength different from the design λ wavelength λ.

A manufacturing system for manufacturing an optical device including an optical element according to an embodiment of the present invention, may comprise: a light source for emitting a plane wave of a wavelength different from a design wavelength of the optical element; a ring-like holding member bonded to a circumferential portion of the optical element and having a thickness larger than the optical element; a rotary stage for rotating the holding member; a blade for cutting or scraping a portion of the holding member; and a detecting system for detecting positional information related to an alignment mark, wherein a portion of the holding member may be cut or scraped on the basis of the positional information of the alignment mark as produced by the detecting system, such that a center of the holding member and a center of the optical element can be brought into registration with each other.

An optical system according to the present invention may include an optical element as recited above.

An optical device according to the present invention may include an optical system having an optical element as recited above, wherein imagewise information can be produced upon a predetermined surface with use of light passing through the optical system.

A projection exposure apparatus according to the present invention may include an optical system LL having an optical element as described above, for illuminating a pattern of a first object with light passing through the optical system, and a projection optical system for projecting the pattern onto a second object.

A device manufacturing method according to the present invention may include a process for illuminating a device pattern on a mask by use of light passing through an optical system having an optical element as described above so that a surface of a wafer is exposed with the pattern, and a process for developing the exposed wafer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are schematic illustrations of a diffractive optical element according to a first embodiment of the present invention, wherein FIG. 1A is a plan view and FIG. 1B is a sectional view of a main portion of the diffractive optical element.

FIGS. 2A and 2B are schematic illustrations of a diffractive optical element according to a second embodiment of the present invention, wherein FIG. 1A is a plan view and FIG. 1B is a sectional view of a main portion of the diffractive optical element.

FIGS. 8 and 9 show a conventional diffractive optical element, wherein FIG. 8A is a plan view and FIG. 9 is a sectional view.

DESCRIPTION OF THE PREFERRED EMBODIMENTS

Figure 1A:
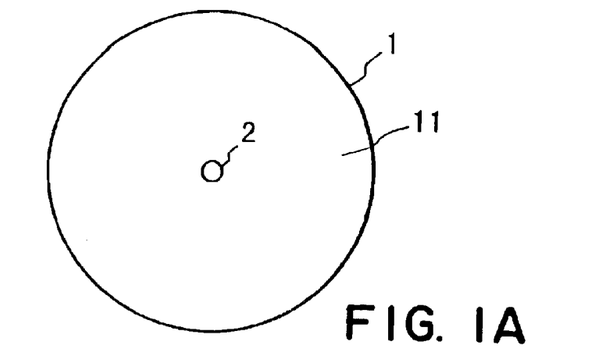
Figure 1B:
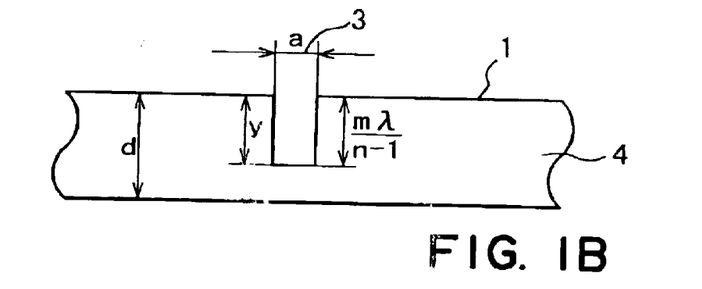

FIGS. 1A and 1B are schematic illustrations of a diffractive optical element (optical element) according to a first embodiment of the present invention, wherein FIG. 1A is a plan view and FIG. 1B is a sectional view of a main portion thereof.

Denoted in these drawings at 1 is a diffractive optical element which has a diffraction grating portion 11 wherein a diffraction grating of a binary shape (step-like shape), a Kinoform shape or a Fresnel shape, for example, is formed. Also, an alignment mark (mark) 2 is formed in a central portion thereof.

In this embodiments, the diffractive optical element 1 is illustrated as being a transmission type. However, the present invention is applicable to a reflection-type optical element.

The diffractive optical element 1 in this embodiment has an alignment mark 2 which, as shown in FIG. 1B, is formed with a small opening 3 and a height (depth) y adapted to provide a phase difference of about $m\lambda/(n-1)$ between a light ray (wavelength $\lambda$) passing through (or reflected by) the mark and a light ray (wavelength $\lambda$) passing through a portion around the mark, where $\lambda$ is the wavelength (design wavelength) to be used with the optical element, m is an integer, and n is the refractive index of the material of a substrate 4 of the optical element with respect to the wavelength $\lambda$. The small opening 3 also has a diameter a. The alignment mark 2 is disposed at a desired position on the structure of the diffractive optical element, particularly, in a region through which the light of the design wavelength $\lambda$ is to pass, such as, for example, at or about a center of the diffractive optical element 1.

With respect to the design wavelength $\lambda$, the alignment mark 2 produces a phase shift (phase difference) corresponding to a multiple of $2\pi$ by an integer, relative to a region around the mark. Thus, when it is incorporated and used in an optical system, an effect equivalent to a structure where such alignment mark is substantially absent, is provided.

Here, the depth (height) approximately satisfying $m\lambda/(n-1)$ refers to a range of ±30% with respect to an idealistic value.

In a process for positioning the center of the diffractive optical element in this embodiment, light of a wavelength $\lambda'$ (alignment wavelength) different from the design wavelength $\lambda$ and satisfying about $m\lambda'/(n'-1)$ (where n' is the refractive index with respect to the wavelength $\lambda'$), is used such that the alignment mark 2 can be practically present. While using such alignment light of the wavelength $\lambda'$, a wavefront from the alignment mark 2 and from a portion around the mark is caused to interfere with a reference wavefront. On the basis of this interference, the position of the alignment mark is detected. Then, in accordance with the detection, the center of the diffractive optical element 1 can be positioned very precisely with respect to the cell.

Alternatively, if necessary, after the cell is bonded to the diffractive optical element, the cell may be machined by use of the alignment mark such that the central position of the cell with regard to a barrel may be adjusted.

Placing an alignment mark 2 at the center of the diffractive optical element 1 as described above, has been undesired conventionally because, when the optical element is incorporated into an optical system, it causes unwanted scattered light or diffraction light. However, if the depth of the mark is set with respect to the design wavelength $\lambda$ as described above, the phase difference to be produced between the wavefront passing through a portion around the alignment mark and the wavefront passing through the center of the alignment mark will be, where the wave number is $k=2\pi/\lambda$ and the thickness of the substrate is d, such as follows:

$$knd - \left\{k, \frac{m\lambda}{n-1} + kn\left(d - \frac{m\lambda}{n-1}\right)\right\} = \frac{(n-1)km\lambda}{(n-1)} = mk\lambda = 2m\pi$$

Thus, the phase difference is a multiple of $2\pi$ by an integer and, therefore, substantially it becomes equivalent to a condition where there is no phase difference. As a result, the system can be used substantially as one having no such alignment mark. For example, in a case where the diffractive optical element is to be incorporated into an optical system to be used with light of an ArF excimer laser and where synthetic quartz is to be used for the substrate, such that the refractive index n=1.56 and a design wavelength $\lambda$=0.193 micron, the diameter of the small opening of the alignment mark may be about 1 micron and the depth thereof may be 3.45 microns.

Figure 2A:
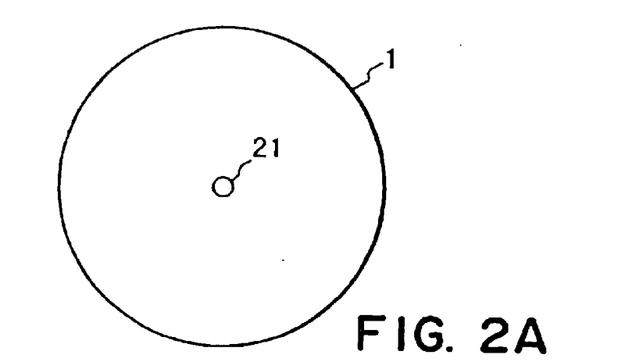
Figure 2B:
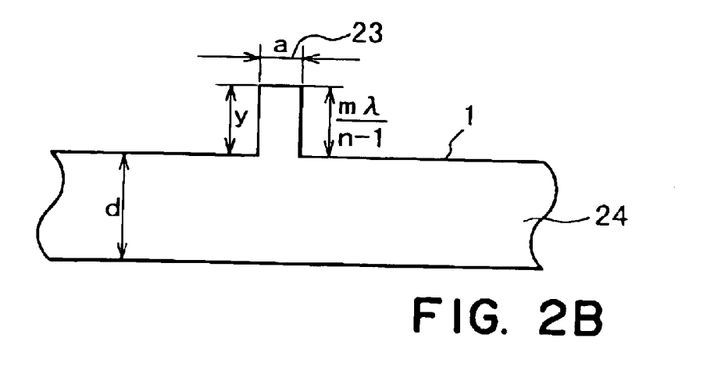

The alignment mark is not limited to a hole with a circular opening. For example, as shown in FIGS. 2A and 2B, it may comprise a protrusion 23 of a round column. Also in this case, like the preceding case, while a substrate 24 of the diffractive optical element 1 has a thickness d and a glass material of the substrate 24 has a relative refractive index n, the alignment mark 21 may comprise a round column with a diameter a and a height y that satisfies about $m\lambda/(n-1)$ where m is an integer.

As in the example described with reference to FIGS. 1A and 1B, in this case, the phase difference to be produced between the wavefront passing through (or reflected by) a peripheral portion around the alignment mark 21 and the wavefront passing through (or reflected by) the center of the alignment mark corresponds to a multiple of $2\pi$ by an integer. Therefore, substantially it becomes equivalent to a condition where there is no phase difference. As a result, the system can be used substantially as one having no such alignment mark, if used with the design wavelength $\lambda$.

Figure 3:
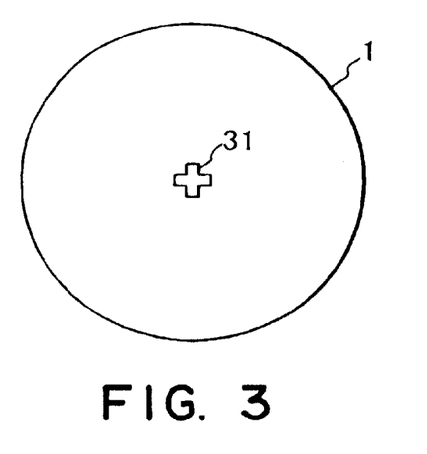
FIG. 3 is a plan view of a diffractive optical element according to a third embodiment of the present invention.

Further, the alignment mark may have a sectional shape other than a circular shape as described above. For example, it may comprise a cross-shape mark 31 such as shown in FIG. 3. The alignment mark 31 may comprise a recess or a protrusion which may be formed at or adjacent a center of the diffractive optical element 1 and formed with a depth or a height satisfying about $m\lambda/(n-1)$ where m is an integer.

Figure 4A:
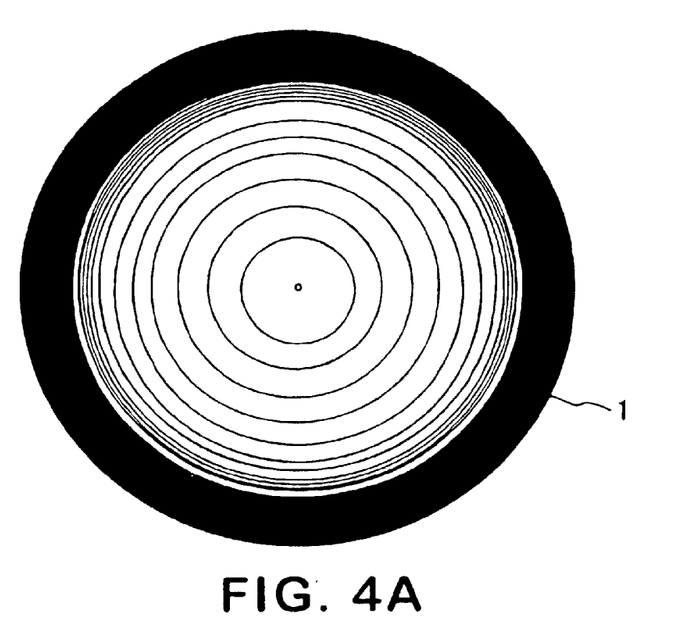
FIGS. 4A and 4B are schematic views for explaining an example wherein a cell is bonded to a diffractive optical element according to the present invention.
Figure 4B:
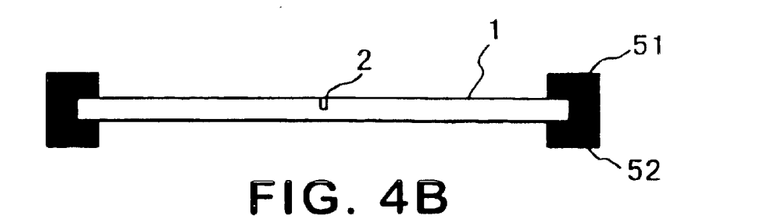

FIGS. 4A and 4B are illustrations for explaining registration between a center of an optical element having an alignment mark and a center of a cell therefor, in accordance with the present invention. FIGS. 4A and 4B are schematic illustrations of an example wherein a cell 51 is bonded to a diffractive optical element 1.

In the example of FIGS. 4A and 4B, the cell 51 comprises a holding member of a ring-like shape, having a thickness larger than that of the diffractive optical element 1. Denoted at 52 is a fixing ring for bonding the cell 51 and the diffractive optical element 1 to each other. Denoted at 2 is an alignment mark which is provided at a center of the diffractive optical element 1.

Figure 5:
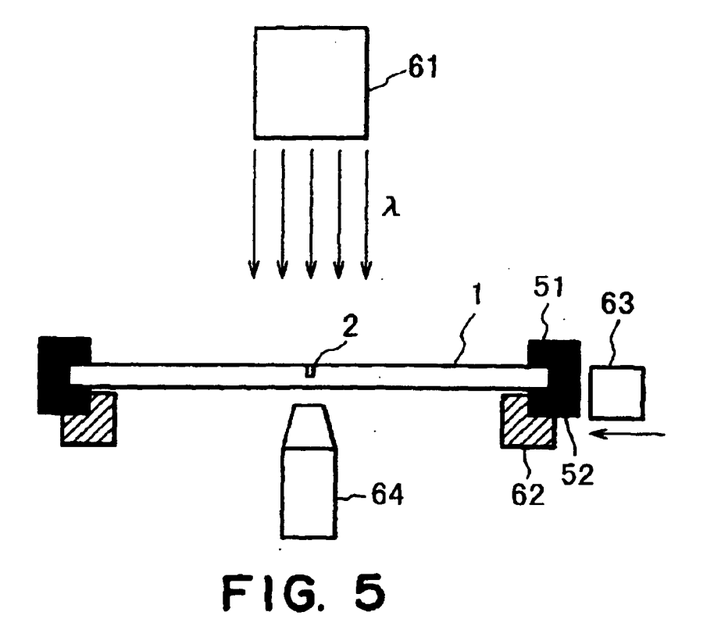
FIG. 5 is a schematic view for explaining a process for registering the center of a cell with a diffractive optical element according to the present invention.

In FIGS. 4A and 4B, the center of the cell 51 and the center of the diffractive optical element 1 are just registered with each other. Once the cell and the optical element are bonded into this state, they can be incorporated together into a barrel for an optical system. Referring to FIG. 5, the process for bonding the cell and the optical element into such state, will be explained.

FIG. 5 illustrates a centering process wherein the position of the alignment mark (mark) 2 of the diffractive optical element 1 is detected and wherein a portion (any eccentric portion) of the cell 51 is removed or scraped while rotating the cell about the central position of the mark 2.

In FIG. 5, denoted at 61 is a light source for emitting a plane wave of a wavelength $\lambda'$ different from the design wavelength $\lambda$. Denoted at 62 is a rotary stage for holding and rotating the cell. Denoted at 63 is a blade for cutting or scraping the cell 51. Denoted at 64 is a detecting system for detecting the alignment mark 2. In this example, the alignment mark 2 is defined by a hole having a circular opening as shown in FIG. 1 and a depth of $m\lambda/(n-1)$ where m is an integer.

The procedure in the centering process will be described sequentially.

First, the cell 51 is bonded to the diffractive optical element 1, and then it is fixed by use of the fixing ring 52. The cell mounted in this manner is then fixedly mounted on the rotary stage 62. Subsequently, a plane wave of a wavelength $\lambda'$ ($\lambda' \cdot m\lambda'(n-1)$ where m is an integer) is emitted from the light source 6 as illumination light, which is projected to a portion around the center of the diffractive optical element 1. Here, the alignment mark 2 is so designed that the phase at a portion adjacent the mark and with respect to the design wavelength $\lambda$ becomes equal to a multiple of $2\pi$ by an integer, and also there is a relation $\lambda' \neq m\lambda'(n'-1)$. Therefore, if a plane wave of the alignment wavelength $\lambda'$ different from the design wavelength $\lambda$ is projected, a phase shift or deviation is produced between a light ray passing through the alignment mark 2 portion and a light ray passing through a region surrounding the mark 2 portion.

As a result, similarly a phase shift is produced upon the detection plane of the detecting system 64, between the plane wave passed through the alignment mark 2 and the plane wave passed through the region around the mark 2. These plane waves are then caused to interfere with a reference plane wave (not shown) of a wavelength $\lambda'$, upon the detection plane of the detecting system 64, by which a high-contrast image of the alignment mark can be produced there. Thus, the position of the alignment mark can be detected on the basis of it.

Alternatively, a phase difference microscope may be used in the detecting system, and the position of the alignment mark 2 can be detected precisely also in that occasion.

After completion of the detection of the alignment mark 2 in the manner described above, the rotary stage 62 is driven by means of an X-Y stage, not shown, so that the center of the detecting system 64 (which corresponds to the rotational center of the rotary stage) and the center of the alignment mark 2 are brought into registration with each other. Then, the rotary stage 62 is rotated while holding the registration.

Figure 6:
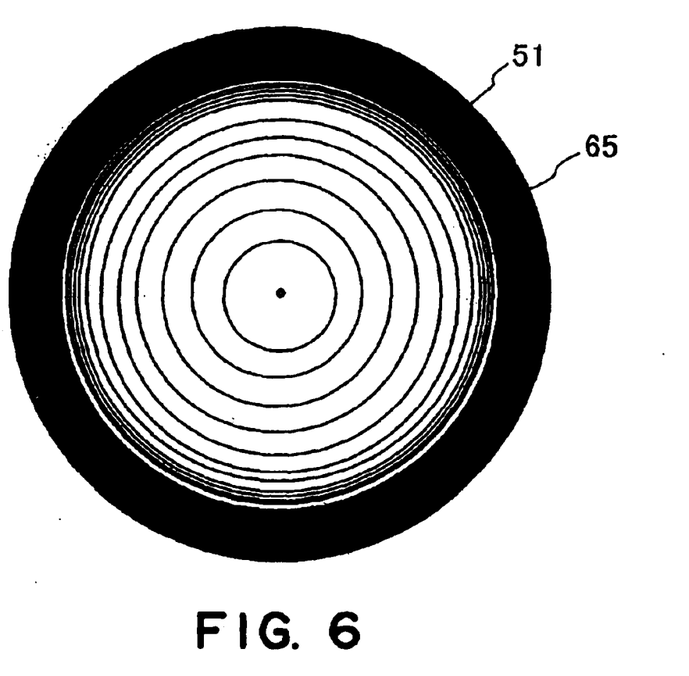
FIG. 6 is a schematic view for explaining a process for removing any eccentric portion of a cell, mounted on a diffractive optical element.

While rotating the rotary stage 62, the blade 63 is gradually moved close to the cell 51, to remove any eccentric portion of the cell, such as depicted at 65 in FIG. 6. As a result of this operation, the cell 51 is machined so that the center thereof is brought into alignment with the center of the alignment mark 2. To this end, preferably the cell 51 should have an original size larger than a desired size therefor.

The cell 51 having its eccentric portion 65 (FIG. 6) removed in the manner described above, is in a state similar to that shown in FIG. 4. By incorporating the same into a barrel of an optical system desired, high-precision optical axis alignment can be accomplished.

Figure 7:
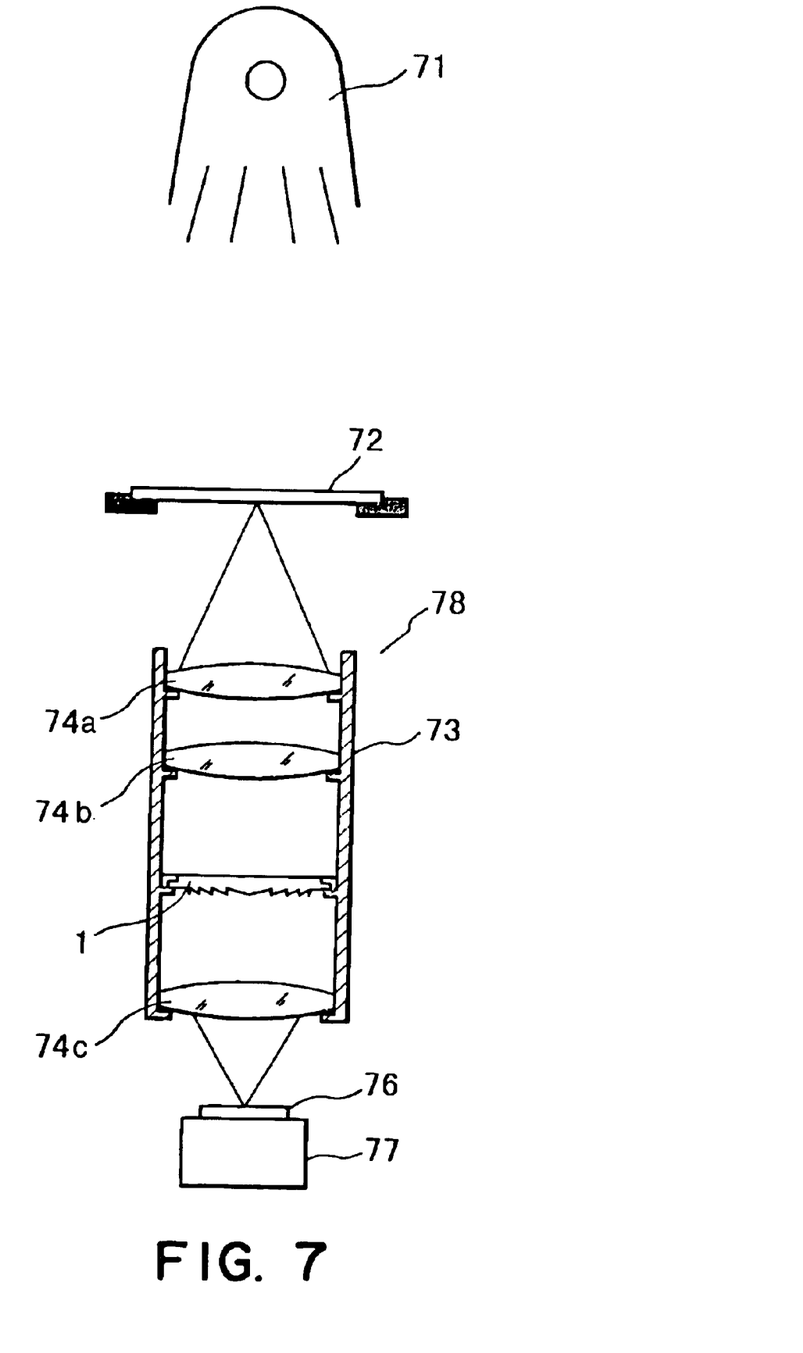
FIG. 7 is a schematic view of an embodiment of an optical system having a diffractive optical element according to the present invention.

FIG. 7 is a schematic view of a main portion of an embodiment wherein an optical system having an optical element according to the present invention is incorporated into a projection exposure apparatus to be used in a lithographic process, in the device manufacturing procedure for production of microdevices such as a semiconductor device (e.g., IC or LSI), an image pickup device (e.g., CCD), or a display device (e.g., liquid crystal panel), for example.

Denoted in FIG. 7 at 71 is a light source, and denoted at 72 is a reticle. Denoted at 73 is a lens barrel for a projection optical system 78. Denoted at 74a–c are lenses of the projection optical system, and denoted at 1 is a diffractive optical element according to the present invention. Denoted at 76 is a wafer, and denoted at 77 is a wafer stage.

The diffractive optical element 1 comprises one according to the first embodiment of the present invention, for example, and here it is arranged to correct chromatic aberration of the lenses 74a–c. The wafer 76 can be positioned at a desired position, by means of the wafer stage 77. The wafer height can be adjusted at a focus position, by means of a focus detecting system (not shown). Here, as required, the reticle may be brought into alignment with a mark of the wafer, having been printed on an underlying layer of the wafer. Upon completion of the focus and alignment operations, a shutter (not shown) is opened such that the reticle 72 is illuminated with illumination light from the light source 71. In response, a circuit pattern formed on the reticle 72 is projected by the projection optical system 78 onto a resist applied to the wafer 76, whereby the wafer is exposed with the reticle pattern.

The thus exposed wafer 76 is then processed by a development operation and an etching operation, for example, known in the art, whereby microdevices can be produced.

An optical system with an optical element according to the present invention can be applied similarly to an optical instrument for image formation or to an illumination system, for example.

The optical element of the present invention is not limited to a diffractive optical element. The present invention is applicable also to various optical elements such as a dioptric element or a catoptric element, for example.

While the invention has been described with reference to the structures disclosed herein, it is not confined to the details set forth and this application is intended to cover such modifications or changes as may come within the purposes of the improvements or the scope of the following claims.

What is claimed is:

1. A diffractive optical element to be used with a design wavelength $\lambda$ and providing for detection of an alignment mark using light of a second wavelength, comprising:

a diffractive surface for diffracting predetermined light of the design wavelength $\lambda$; and an alignment mark formed in a portion of the diffractive surface, wherein, with regard to the predetermined light, a phase difference corresponding to a multiple, by an integer, of the design wavelength $\lambda$ is produced between (i) a light ray, of the predetermined light, as transmitted through or reflected by the alignment mark and (ii) a light ray, of the predetermined light, as transmitted through or reflected by a portion adjacent to the alignment mark, and that, with regard to second light of the second wavelength $\lambda'$ different from the design wavelength $\lambda$, no phase difference corresponding to a multiple, by an integer, of the second wavelength $\lambda'$ is produced between (a) a light ray, of the second light, as transmitted through or reflected by the alignment mark and (b) a light ray, of the second light, as transmitted through or reflected by a portion adjacent to the alignment mark.

2. A diffractive optical element according to claim 1, wherein the alignment mark is disposed substantially at the center of the diffractive surface.

3. A diffractive optical element according to claim 1, wherein the alignment mark is defined by a recess formed on the diffractive surface.

4. A diffractive optical element according to claim 1, wherein the alignment mark is defined by a protrusion formed on the diffractive surface.

5. A diffractive optical element according to claim 1, wherein the diffractive surface and the alignment mark are adapted to transmit light rays of the design wavelength $\lambda$ and the second wavelength $\lambda'$.

6. A diffractive optical element according to claim 1, wherein the diffractive surface and the alignment mark are adapted to reflect light rays of the design wavelength $\lambda$ and the second wavelength $\lambda'$.

7. A diffractive optical element according to claim 1, wherein the diffractive surface comprises binary optics, and wherein the diffractive surface and the alignment mark are formed in accordance with a lithographic process.

8. A diffractive optical element according to claim 1, further comprising a substrate on which the diffractive surface and the alignment mark are formed.

9. A diffractive optical element according to claim 1, wherein the alignment mark is placed at a center of the diffractive surface.

10. A diffractive optical element according to claim 9, wherein the alignment mark and the center of the diffractive surface are aligned with each other, on the basis of detection of the alignment mark by use of the light of the second wavelength.

11. A projection optical system comprising:

a lens; and a diffractive optical element as recited in claim 1.

12. A projection exposure apparatus for projecting a pattern onto a substrate comprising:

a light source for illuminating the pattern; and a projection optical system as recited in claim 11, the projection optical system for projecting to project the pattern onto the substrate.

13. A device manufacturing method, comprising the steps of:

exposing a substrate with a device pattern by use of light having a wavelength $\lambda$ and by use of an exposure apparatus having a diffractive optical element, the diffractive optical element including (1) a diffractive surface for diffracting predetermined light corresponding to the wavelength $\lambda$, and (2) an alignment mark formed in a portion of the diffractive surface, wherein, with regard to the predetermined light, a phase difference corresponding to a multiple, by an integer, of the wavelength $\lambda$ is produced between (i) a light ray, of the predetermined light, as transmitted through or reflected by the alignment mark and (ii) a light ray, of the predetermined light, as transmitted through or reflected by a portion adjacent to the alignment mark, and that, with regard to second light of a second wavelength $\lambda'$ different from the wavelength $\lambda$, no phase difference corresponding to a multiple, by an integer, of the second wavelength $\lambda'$ is produced between (a) a light ray, of the second light, as transmitted through or reflected by the alignment mark and (b) a light ray, of the second light, as transmitted through or reflected by a portion adjacent to the alignment mark, whereby a position of the alignment mark is detected using the light of the second wavelength; and developing the exposed substrate.

* * * * *

UNITED STATES PATENT AND TRADEMARK OFFICE
CERTIFICATE OF CORRECTION

PATENT NO. : 6,856,392 B1
DATED : February 15, 2005
INVENTOR(S) : Toshihiko Tsuji It is certified that error appears in the above-identified patent and that said Letters Patent is hereby corrected as shown below:

<u>Title page,</u>
Item [56], References Cited, FOREIGN PATENT DOCUMENTS,
"08083747 A" should read -- 08-083747 A --.
Item [57], ABSTRACT,
Line 13, "second wavelength λ" should read -- second wavelength λ' --.

<u>Column 1,</u>
Line 55, "small as much" should read -- as small --; and
Line 63, "hereinafter," should read -- hereinafter referred to as --.

<u>Column 3,</u>
Line 46, "according a" should read -- according --; and
Line 65, "to" should read -- into --.

<u>Column 4,</u>
Line 26, "design λ wavelength λ" should read -- design wavelength λ --; and
Line 51, "optical system LL" should read -- optical system --.

<u>Column 5,</u>
Line 29, "FIG. 8A" should read -- FIG. 8 --.

<u>Column 7,</u>
Line 53, "(λ'•mλ'(n–1)" should read -- (λ' ≠ mλ'(n–1) --.

<u>Column 8,</u>
Line 26, "cell 51" should read -- cell 51, --.

Signed and Sealed this

Ninth Day of August, 2005

JON W. DUDAS
*Director of the United States Patent and Trademark Office*